(12) United States Patent
Gruenbaum et al.

(10) Patent No.: US 12,436,845 B1
(45) Date of Patent: Oct. 7, 2025

(54) MULTI-DATABASE QUERY MODEL IN A DATABASE BACKUP SYSTEM

(71) Applicant: Eon IO, Ltd., Tel Aviv (IL)

(72) Inventors: Benjamin Gruenbaum, Herzliya (IL); Ron Kimchi, Tel Aviv (IL); Amir Yonatan, Tel Aviv-Jaffa (IL); Assaf Natanzon, Tel Aviv (IL); Erez Reuven, Raanana (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 19/051,930

(22) Filed: Feb. 12, 2025

(51) Int. Cl.
  *G06F 16/00* (2019.01)
  *G06F 11/14* (2006.01)
  *G06F 16/248* (2019.01)
  *G06F 16/28* (2019.01)

(52) U.S. Cl.
  CPC ........ *G06F 11/1458* (2013.01); *G06F 16/248* (2019.01); *G06F 16/285* (2019.01); *G06F 2201/80* (2013.01)

(58) Field of Classification Search
  CPC ... G06F 16/285; G06F 16/248; G06F 11/1458
  USPC ........................................................ 707/654
  See application file for complete search history.

(56) References Cited

U.S. PATENT DOCUMENTS

| | | | | |
|---|---|---|---|---|
| 11,087,054 B2* | 8/2021 | Austern | ............ | G06F 30/18 707/707 |
| 2023/0252233 A1* | 8/2023 | Gutierrez | ............ | G06F 40/20 704/9 |
| 2023/0306061 A1* | 9/2023 | Bui | ............ | G06F 16/242 707/707 |
| 2024/0070448 A1* | 2/2024 | Sagar | ............ | G06F 9/54 707/707 |
| 2024/0252154 A1* | 8/2024 | Vermeulen | ............ | A61B 10/0045 707/707 |
| 2024/0362278 A1* | 10/2024 | PerezLeon | ............ | G06F 40/40 707/707 |
| 2024/0394249 A1* | 11/2024 | Cunningham | ............ | G06F 16/2425 707/707 |
| 2024/0419706 A1* | 12/2024 | Gutierrez | ............ | G06F 40/166 707/707 |
| 2025/0013649 A1* | 1/2025 | Gladwin | ............ | G06F 16/221 707/707 |
| 2025/0021148 A1* | 1/2025 | Gladwin | ............ | G06F 1/263 707/707 |
| 2025/0021560 A1* | 1/2025 | Gladwin | ............ | G06F 16/24545 707/707 |

(Continued)

*Primary Examiner* — Alexandria Y Bromell
(74) *Attorney, Agent, or Firm* — M&B IP Analysts, LLC

(57) ABSTRACT

A system and method for querying multiple database tables in a database backup are provided. The method includes receiving identification of database tables to query, wherein the database tables in a column-based format, and the database backup includes for each database table classification data for at least classifying its respective column names; generating a prompt for a first language model that provides a set of queries targeting the database tables, wherein the generated prompt is based on at least a received input query and the classification data for the database tables; executing the set of queries on the database tables, wherein each query of the set of queries is executed on a respective database table; and aggregating and displaying results returned in response to the execution of the set of queries.

19 Claims, 6 Drawing Sheets

(56) References Cited

U.S. PATENT DOCUMENTS

| | | | |
|---|---|---|---|
| 2025/0021566 A1* | 1/2025 | Gladwin | G06F 16/2428 |
| | | | 707/707 |
| 2025/0077511 A1* | 3/2025 | Zhao | G06F 16/252 |
| | | | 707/707 |
| 2025/0110948 A1* | 4/2025 | Nguyen | G06F 16/283 |
| | | | 707/707 |
| 2025/0152337 A1* | 5/2025 | Bruchman | A61F 2/2409 |
| | | | 707/707 |
| 2025/0156413 A1* | 5/2025 | Barkan | G06F 16/24522 |
| | | | 707/707 |

* cited by examiner

| BookID | BookName | Price | QuantityAvailable |
|---|---|---|---|
| 1 | The Great Gatsby | 10.99 | 25 |
| 2 | 1984 | 8.99 | 40 |
| 3 | To Kill a Mockingbird | 12.50 | 30 |
| 4 | Pride and Prejudice | 9.75 | 15 |
| 5 | The Catcher in the Rye | 11.20 | 20 |

FIGURE 2A

```
/ Document 1
{
  "_id": ObjectId("64f1c2b8e9a1b2c3d4e5f678"),
  "titleName": "The Great Gatsby",
  "authorName": "F. Scott Fitzgerald",
  "price": 10.99
}

// Document 2
{
  "_id": ObjectId("64f1c2b8e9a1b2c3d4e5f679"),
  "titleName": "1984",
  "authorName": "George Orwell",
  "price": 8.99
}

// Document 3
{
  "_id": ObjectId("64f1c2b8e9a1b2c3d4e5f67A"),
  "titleName": "To Kill a Mockingbird",
  "authorName": "Harper Lee",
  "price": 12.50
}

// Document 4
{
  "_id": ObjectId("64f1c2b8e9a1b2c3d4e5f67B"),
  "titleName": "Pride and Prejudice",
  "authorName": "Jane Austen",
  "price": 9.75
}

// Document 5
{
  "_id": ObjectId("64f1c2b8e9a1b2c3d4e5f67C"),
  "titleName": "The Catcher in the Rye",
  "authorName": "J.D. Salinger",
  "price": 11.20
}
```

FIGURE 2B

MULTI-DATABASE QUERY MODEL IN A DATABASE BACKUP SYSTEM

TECHNICAL FIELD

The present disclosure relates generally to digital backup and restoration, and specifically to querying multiple databases in database backups.

BACKGROUND

A relational database is a type of database that organizes data into tables (also called relations) consisting of rows and columns. Each table represents an entity (e.g., customers, orders, products), and relationships between tables are established using keys (primary keys and foreign keys). A non-relational database (often called NoSQL database) is a type of database that does not use the traditional table-based relational structure (rows and columns) like SQL databases. Instead, it uses flexible data models that allow for scalability, speed, and diverse data storage. Examples of NoSQL databases include MongoDB and CouchDB. Examples of SQL databases include PostgreSQL, MySQL, MSSQL, and the like.

At present, there are no effective methods for submitting queries that can retrieve data or perform operations across multiple databases of different types. For instance, consider an online bookstore that has acquired several physical bookstores. Each bookstore maintains a catalog of its books in a separate database. Some databases may be NoSQL (such as MongoDB), while others may be SQL databases (like PostgreSQL).

To submit, for example, a query to PostgreSQL® or MongoDB®, it is necessary to convert the input query, whether in SQL or free text, into a series of queries that align with the data model or schema of the target database. Currently, this conversion is done manually, which may not always be accurate but often requires significant resources.

Database backup is the process of creating copies of data to protect against data loss, corruption, or hardware failure. Backups ensure that information can be restored if something goes wrong, maintaining data availability and minimizing downtime. There are several types of backups used to meet different recovery needs. Currently, backups cannot be queried from information stored in different databases.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include receiving an identification of database tables to query, where the database tables are stored in the database backup in a column-based format, and where the database backup includes each database table classification data for at least classifying its respective column names; generating a prompt for a first language model that, when executed by a generative AI system, provides a set of queries targeting the database tables, where the generated prompt is based on at least a received input query and the classification data for the database tables; executing the set of queries on the database tables, where each query of the set of queries is executed on a respective database table; and aggregating and displaying results returned in response to the execution of the set of queries. Other embodiments of this aspect include corresponding computer systems, apparatus, and computer programs recorded on one or more computer storage devices, each configured to perform the actions of the methods.

Implementations may include one or more of the following features. The method where each query of the set of queries is of the same query language complaint with the column-based format of the database backup. The method where the input query is a free text query. The method where the database tables to query are database tables of different database applications. The method where a database application is at least any one of: a NoSQL database application and a SQL database application. The method may include. classifying at least column names of a database table. The method may include: generating a prompt to a second language model based on at least a set of values in each column in the database table, the prompt, when executed by the generative AI system, outputs classification data for the database table; and saving the classification data in the metadata of the digital backups. The method where the classification data includes, for each column in the database table, a category, a unified column name, and semantic meanings. 9 where the first language model is different than the second language model. The method where the first language model is tuned based on classification data of the database tables. Implementations of the described techniques may include hardware, a method or process, or a compute-tangible medium.

In one general aspect, a non-transitory computer-readable medium may include one or more instructions that, when executed by one or more processors of a device, cause the device to: receive identification of database tables to query, where the database tables are stored in the database backup in a column-based format, and where the database backup includes for each database table classification data for at least classifying its respective column names. The non-transitory computer-readable medium may also include generating a prompt for a first language model that, when executed by a generative AI system, provides a set of queries targeting the database tables, where the generated prompt is based on at least a received input query and the classification data for the database tables. Medium may furthermore include executing the set of queries on the database tables, where each query of the set of queries is executed on a respective database table; and aggregating and displaying results returned in response to the execution of the set of queries. Other embodiments of this aspect include corresponding computer systems, apparatus, and computer programs recorded on one or more computer storage devices, each configured to perform the actions of the methods.

In one general aspect, the system may include one or more processors configured to: The system may also include receiving identification of database tables to query, where the database tables are stored in the database backup in a column-based format, and where the database backup includes for each database table classification data for at least classifying its respective column names. The system may furthermore include generating a prompt for a first language model that, when executed by a generative AI system, provides a set of queries targeting the database tables, where the generated prompt is based on at least a received input query and the classification data for the database tables. The system may in addition include execute the set of queries on the database tables, where each query of the set of queries is executed on a respective database table. The system may, moreover, aggregate and display results returned in response to the execution of the set of queries. Other embodiments of this aspect include corresponding computer systems, apparatus, and computer programs recorded on one or more computer storage devices, each configured to perform the actions of the methods.

Implementations may include one or more of the following features. System where each query of the set of queries is of the same query language complaint with the column-based format of the database backup. System where the input query is a free text query. System where the database tables to query are database tables of different database applications. System where a database application is at least any one of: a NoSQL database application and a SQL database application. System where the one or more processors are further configured to: classify at least column names of a database table. System where the one or more processors are further configured to: generate a prompt to a second language model based on at least a set of values in each column in the database table, the prompt, when executed by the generative AI system, outputs classification data for the database table; and save the classification data in the metadata of the digital backups. System where the classification data includes, for each column in the database table, a category, a unified column name, and semantic meanings. System where the first language model is different than the second language model. The system where the first language model is tuned based on classification data of the database tables. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 2A and 2B are examples of Table and Collection utilized to describe the disclosed embodiments.

DETAILED DESCRIPTION

Figure 1:
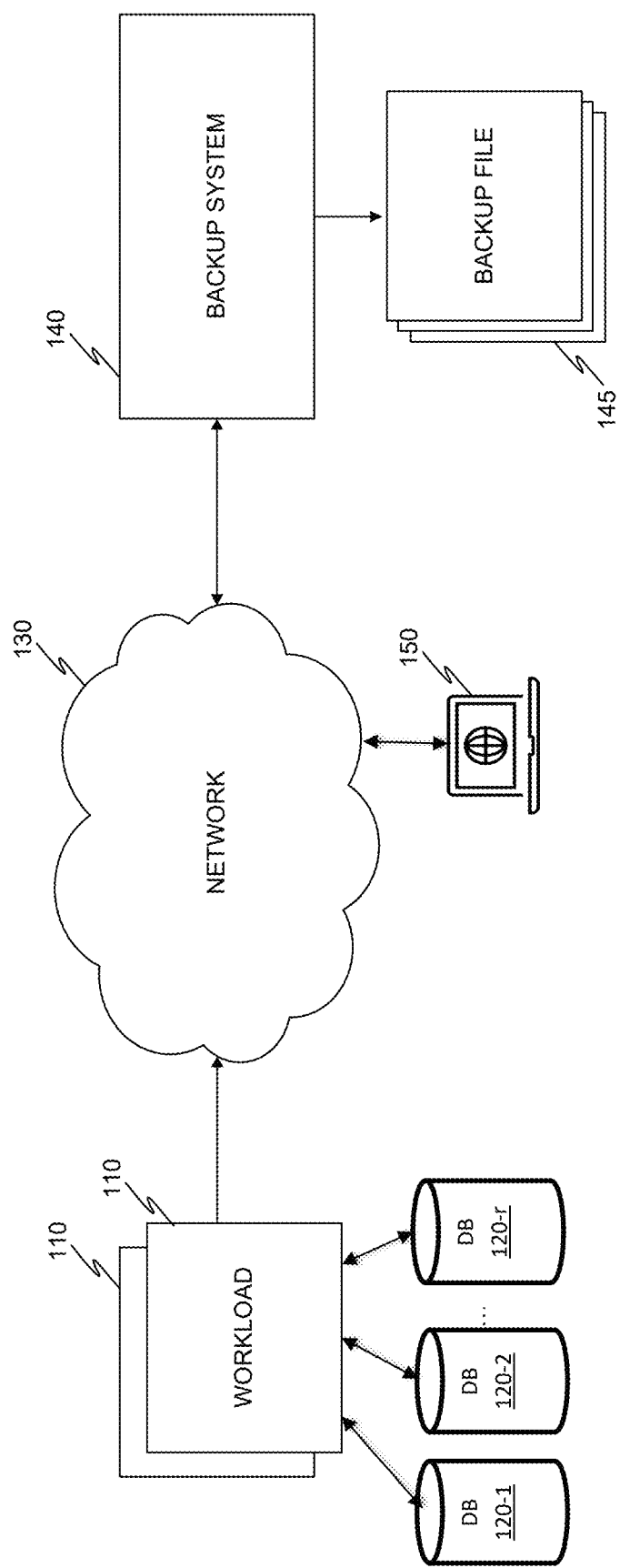
FIG. 1 is a network diagram including a database backup system, utilized to describe some disclosed embodiments.

It is important to note that the embodiments disclosed herein are only examples of the many advantageous uses of innovative teachings. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, numerals refer to like parts through several views.

Database backup is the process of creating copies of data to protect against data loss, corruption, or hardware failure. Backups ensure that information can be restored if something goes wrong, maintaining data availability and minimizing downtime. There are several types of backups used to meet different recovery needs. A full backup captures the entire database, offering a complete snapshot at a specific point in time. Incremental backups, on the other hand, store only the changes made since the last backup, making them more space-efficient but requiring all previous backups for a full restoration. Differential backups store changes made since the last full backup, striking a balance between efficiency and ease of recovery.

Cloud-based databases can be implemented as managed databases, such as Amazon® RDS, or by deploying a virtual machine, such as an Amazon® EC2 instance with a database application installed thereon. Such a machine can include many temporary files which occupy a large amount of storage space. Additionally, an older database backup may utilize a previous version of the database application, such that when it is restored it may cause a cybersecurity risk, as an outdated application.

The disclosed embodiments allow the execution of queries on a database (DB) backup, where such backup maintains data from databases of different types. The query executed, according to the disclosed embodiment, is a single free text or SQL query. According to an embodiment, the execution of such a query is enabled on a DB backup generation to efficiently solve a number of technical problems, such as slow backup and recovery, and slow execution of queries.

Furthermore, the disclosed embodiments remove the need to manually convert an input query into multiple queries that are based on the model of a target database. As such, queries can be executed faster and more accurately. The disclosed embodiments further allow for organization, to scale and integrate database solutions with less computing resources and less time. It should be emphasized that currently, no solution in the related art allows for querying multiple tables residing in different databases of different types (e.g., MySQL and MongoDB).

The disclosed embodiments allow a user to select database tables (or simply tables) included in the database backup and run a free text query on such selected tables. The query results are retrieved from the selected tables, aggregated, and displayed to the user.

Note that NoSQL databases use different terminology than SQL (relational) databases for the data they store. For example, in SQL databases, a "table" corresponds to a "collection," a "row" is similar to a "document," a "column" is equivalent to a "field," and a "primary key" is represented by an "ID," which serves as the default unique identifier. This description will primarily employ terminology from SQL databases for clarity, but the disclosed embodiments are not limited to these types of databases.

FIG. 1 is an example network diagram including a database backup system, utilized to describe some disclosed embodiments. As illustrated in FIG. 1, a plurality of databases 120-1, 120-2, . . . , 120-r are backed up by the backup system 140 into backup files 145. Database 120 may include a database application, a database management system (DBMS), a combination thereof, and the like. In some embodiments, a database 120 may be a column-oriented database, a relational database, a tabular relational database, a document-oriented database, or the like. For example, a database 120-1 is implemented using MySQL, and a database 120-1 is MongoDB. In an embodiment, database 120 may include metadata, such as a database schema. In some embodiments, the database schema includes a data structure, such as a table, including a plurality of keys, at least a portion of which corresponds to columns of the table.

In certain embodiments, the databases 120 are deployed on one or more workloads 110. In an embodiment, workload 110 is a physical computing device, a virtual computing device (e.g., a virtual machine), a combination thereof, and the like. In some embodiments, a workload 110 is a software container. In an embodiment, a software container is deployed on a software container platform, such as Kubernetes®, Docker®, and the like.

According to an embodiment, a workload 110 is implemented as a virtual machine, a software container, a serverless function, a combination thereof, and the like. In some embodiments, a database 120 is implemented as a managed database, for example utilizing Amazon® RDS. In an embodiment, a virtual machine is deployed as an Amazon® EC2 instance. A software container is deployed on a container platform such as Kubernetes®, Docker®, and the like. In some embodiments, a serverless function is deployed as an Amazon® Lambda function.

In an embodiment, workload 110 is configured to provide access to database 120, for example, over a network 130. In some embodiments, a cloud computing infrastructure is implemented on network 130. For example, in an embodiment, a cloud computing infrastructure is Amazon® Web Services (AWS), Google® Cloud Platform (GCP), Microsoft® Azure, and the like. In certain embodiments, the cloud computing infrastructure is utilized to deploy a cloud computing environment. In an embodiment, a cloud computing environment is a virtual private cloud (VPC), a virtual network (VNet), a virtual private network (VPN), a combination thereof, and the like.

In some embodiments, workload 110 is configured to provide access to database 120 and a database backup system 140 (also referred to as a backup system 140). In an embodiment, backup system 140 is configured to generate a backup of database 120. In an embodiment, backup system 140 is implemented as a virtual machine, a software container, a serverless function, a combination thereof, and the like.

In an embodiment, backup system 140 is configured to generate a backup of a database (hereinafter a "DB backup") by determining a retrieval key of a database 120. For example, the DB backup includes only data from the database, only data of the database includes data exported from the database, a database schema, a combination thereof, and the like.

Backup system 140 is configured to generate a restored database from backup files 145. The restored database contains original data prior to backup, regardless of the changes made during the backup process.

In an embodiment, backup system 140 is configured to generate a DB backup based on the data stored in databases 120. In certain embodiments, DB backup includes a plurality of backup files 145. In an embodiment, the backup files 145 include data files, stored each as a column-oriented data file. A column-oriented data file is, for example, Apache® Parquet. In an embodiment, values of each column of database 120 are stored in serial, contiguous, and the like, memory locations, which allows several benefits, such as improved column-wise compression and reduced query execution processing by reading only the column and not an entire row of data, where the contents of the row may not be relevant to the query.

Backup system 140 may be configured to determine a retrieval key of the database. The retrieval key may be any key, value, keyword, index, or the like. To this end, backup system 140 is configured to generate a plurality of queries based on the retrieval key, each query returning a plurality of rows of data from the database. The plurality of rows may be stored as at least a column-oriented data file, e.g., the backup files 145.

According to an embodiment, a retrieval key is a database key that includes values that are unique for each row. For example, a retrieval key is, in an embodiment, an index value. As no two rows can have the same index value, an index value can be used as a retrieval key. In some embodiments, a retrieval key is a composite key, i.e., a combination of a key value of a first column and a key value of a second column, which together form a unique value.

According to the disclosed embodiments, the backup system 140 generates metadata that facilitates the execution of queries on tables from different DB types. These tables may originate from the same database 120 or different databases (e.g., 120-1 or 120-2), which can be of the same or different types. The metadata includes the content classification of each column in every table within each database 120. In one embodiment, classifying the content includes generating a prompt and prompting a generative AI system executing a language model. The prompt may include the contents of each column with a result to output the category of the column. This generated description may be used as the column name, ensuring a unified naming convention across different tables. It is important to note that the name of a column in a table remains unchanged.

For example, columns that contain residential addresses in different tables may be labeled as "home address," "place of residency," or "mailing address." While the format of the content may be similar, or perhaps even identical, a language model (LLM) would classify the contents of these columns under the same description. This information could then be processed using the LLM for classification. An example prompt may include:

"What would be a category for a column in a database having the following column values: 150 Morristown rd., Basking Ridge, NJ; 201 Broadway Ave, NY; 130 main street, Springfield, NJ"

In one embodiment, the same prompt and the same LLM are utilized to unify the column names, ensuring consistent results. An LLM can include, but is not limited to, various types of large language models, such as GPT-4 (OpenAI), Claude (Anthropic), Gemini (Google), and LLaMA (Meta), among others. In an embodiment, the prompt may be a preconfigured template, where the contents of the columns are the variable parts of this template. The large language model (LLM) is operated by a generative AI system, which may be defined as the processing circuitry of the backup system 140. In one embodiment, the generative AI system is external to system 140 and is accessed by the backup system 140 through an API.

In one example, only a subset of the values from a column is included in the prompt and provided to the LLM. This approach is used to improve response time and decrease the computational resources required by LLM.

FIGS. 2A and 2B show an example of classifying column names (or fields) according to an embodiment. FIG. 2A is an example SQL table 200 of an inventory of a first bookstore maintained in a PostgreSQL® database. The column names in table 200 are "BookID", "BookName", "Price", and "QuantityAvailable". The table 200 is named "Books".

FIG. 2B is an example Collection 220 of an inventory of a second bookstore maintained in MongoDB. Collection 220 includes 4 documents, each with 4 fields named "_id," "titleName," "authorName," and "price." The Collection 220 is named "titles". Both Table 200 and Collection 200 are included in a DB backup generated by backup system 140.

According to the disclosed embodiments, backup system 140 prompts an LLM to classify the elements in Table 200 and Collection 220. Example prompts may include:

1. What are the semantic meanings of columns of <<contents of Table 220>>
2. What are the semantic meanings of columns of <<contents of Collection 200>>

Note that "contents of Table 200" and "contents of Collection 220" are shown in FIGS. 2A and 2B and not repeated herein. In response to the first prompt, the output of LLM may include:

TABLE 1

| Column Name | Type | Description | Semantic Meaning |
|---|---|---|---|
| BookID | INT (Integer) | Purpose: Serves as the unique identifier for each book in the bookstore's inventory. Characteristics: Primary Key: Ensures that each BookID is unique across all records. Auto-Incremented: Automatically increases by 1 for each new book added, ensuring uniqueness without manual intervention. | Identification: Acts as a unique reference number for each book, facilitating easy retrieval, updates, and management of records within the database. Data Integrity: Prevents duplicate entries and maintains the integrity of the dataset by ensuring that each book can be distinctly identified. |
| BookName | VARCHAR(255) (Variable Character String up to 255 characters) | Purpose: Stores the title of the book. Characteristics: Textual Data: Contains alphanumeric characters, spaces, and possibly special characters that make up the book's title. Not Null: Typically set to NOT NULL to ensure that every book record has a title. | Identification: Provides the official name of the book as recognized by readers, authors, and publishers. User Interaction: Essential for displaying book titles to customers, searching for books, and categorizing inventory. Marketing and Sales: Helps in promoting books by their titles and is crucial for all sales and marketing activities. |
| Price | DECIMAL(10, 2) (Decimal Number with Precision) | Purpose: Represents the selling price of the book. Characteristics: Numerical Data contains numbers and a currency symbol. | |

In response to the second prompt, the output of LLM may include:

TABLE 2

| Column Name | Data Type | Purpose | Semantic Meaning |
|---|---|---|---|
| BookID | INT | Unique identifier for each book | Ensures each book can be distinctly identified and managed within the database |
| BookName | VARCHAR(225) | Title of the book | Provides the official name for identification, searching, and marketing purposes |
| Price | DECIMAL(10, 2) | Selling price of the book | Represents the financial value, influences sales strategy, and aids in inventory valuation |
| QuantityAvailable | INT | Number of copies available in the store | Facilitates inventory management, sales operations, and ensures operational efficiency |

The outputs of the LLMs are presented in a table format for simplicity. The outputs generated by the LLM for classifying column names will be referred to as classification data.

In one embodiment, the classification data with respect to each table is stored as metadata for the DB backup. That is, the backup database would include each table (or collection) of the respective classification data. In an embodiment, the classification data, and hence metadata may include the original column names and their unified names determined by the classification process. For example, for Collection 220, shown in FIG. 2B, the field values to be stored in metadata are <BookID, BookName, Price> and <ObjectID, TitleName, Price>.

In an embodiment, the classification process is performed on a set of tables selected by a user. As such, the metadata would include the classification data of such columns only.

The disclosed embodiments allow for querying multiple different tables of database applications of different types without implementing a conversion model from one type to another. This is performed, in part, by utilizing the classification data to generate queries in compliance with target tables and, hence, target databases. As mentioned earlier, although the terms "tables" and "columns" are used here, the disclosed embodiments apply to any type of database, including, but not limited to, NoSQL databases.

In this embodiment, the process starts by prompting the user to select two or more tables for querying. These tables are part of the DB backup created according to the disclosed embodiment. Specifically, the DB backup includes files in a column-based format, along with metadata that stores at least the classification data. The DB backup may include copies of the databases from different points in time. The user can select a specific point in time to run the query. In one example, the default point in time is the most recent backup of the selected tables.

Next, the user is prompted to enter a query, referred to as an "input query." In an embodiment, the input query is in free text format, meaning it is not required to follow any specific SQL or other query language structure.

Based on the input query, a set of queries, referred to as "target queries," is generated. Each target query is designed to be submitted to a specific selected table and includes the designated column names from the table along with their unified names. These target queries are written in a query language that is compatible with the DB backup. For example, if the database backup files are saved in Parquet format, the target queries will be written in SQL. That is, even if some of the backed-up tables are on the NoSQL database application, the target queries are still in SQL.

The target queries are executed on the DB backup, where each query queries its respective selected target table. The responses from the target queries are aggregated and presented to the user.

As the selected tables may be of different database applications, the disclosed embodiments provide an efficient way to query multiple databases without developing any conversion model and without understanding or having information on the database schema. The user may simply use a free text query or question and select tables to retrieve the information, and backup system 140 generates the necessary target queries and provides the results in an aggregated way. The disclosed query process can return results in a matter of seconds, as it is executed on backup files having a unified (unified) format. Further, executing a number of queries simultaneously on different tables stored in backup files also performs the query process without consuming much compute resources that would have otherwise been required when implementing various conversion models.

In an embodiment, a target query is generated using an LLM. To this end, a prompt is engineered using the classification data of a target database, the text of the input query (or portion thereof), and a predefined template. For example, the predefined template may include:

create a query for a database with <<Classification Data of a Specific table>>> which <<text of input query>>

As discussed above, the classification data may include the columns' semantics.

To engineer the prompt, backup system 140 retrieves the classification data from the metadata, using, for example, an ID or the name of a selected table. In an embodiment, instead of the classification data, the prompt may include some elements of the target table.

In one embodiment, a prompt may be created for each selected table. Alternatively, a selected prompt may serve as a template to generate a set of target queries for all selected tables.

In an embodiment, the LLM used to process the generated prompt is trained or tuned based on the classification data of all tables in the DB backup. Using a trained LLM may allow for achieving accurate results in less time. In another embodiment, different versions or models may be used to classify the columns and to generate queries. Each LLM may be selected to better fit the required tasks. For example, Bidirectional Encoder Representations from Transformers (BERT) can be used for classification, and GPT 4.0 can be used to generate target queries. Selection of different LLMs may be advantageous to save on computing resources and costs. However, it should be noted that the same LLM can be used for the same task.

Figure 3:
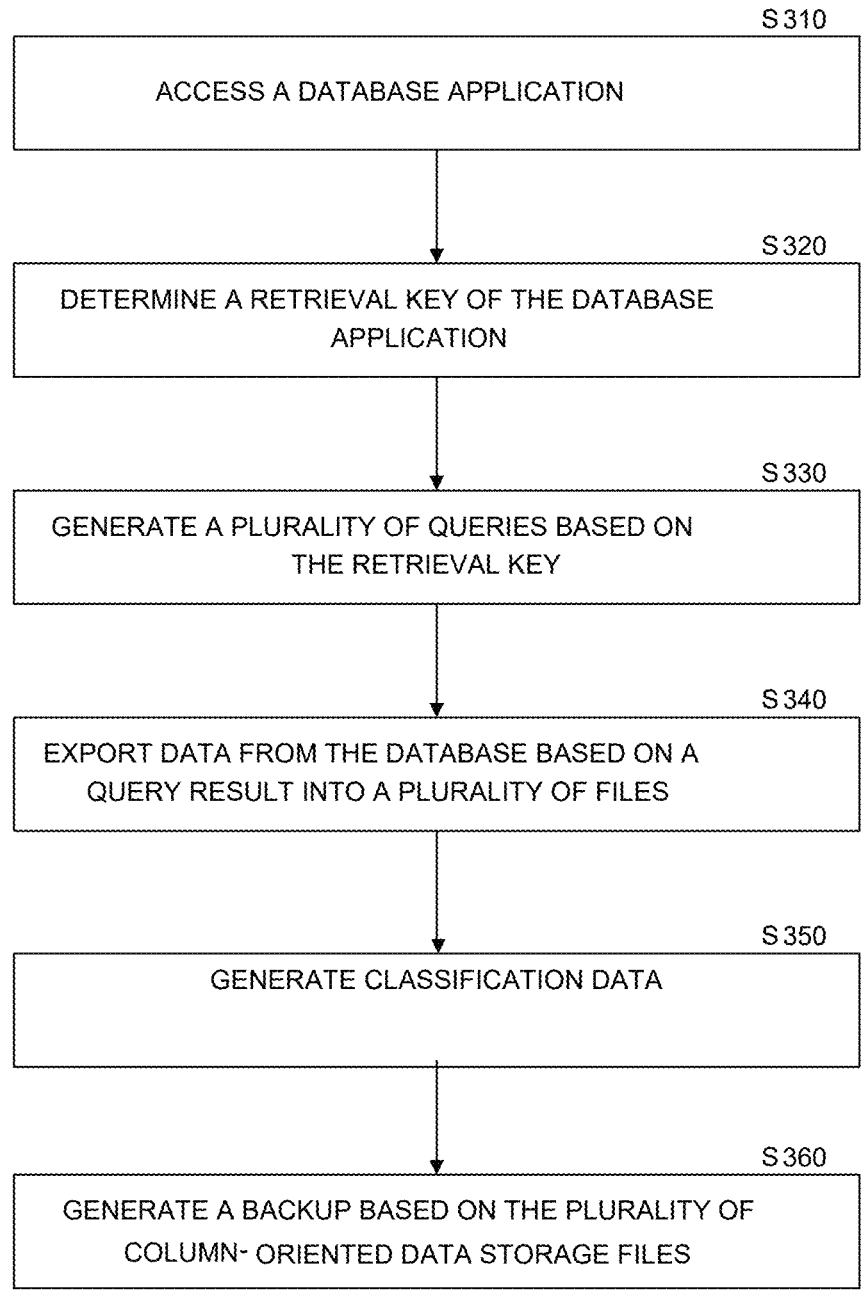
FIG. 3 is an example flowchart of a method for generating a database backup, implemented in accordance with an embodiment.

FIG. 3 is an example flowchart of a method for generating a DB backup that can be utilized for multi-model queries in accordance with an embodiment. The method may be performed by backup system 140. In an embodiment, generating the DB backup includes generating a backup of the machine hosting the database (which omits the data of the database) and generating a backup of the data of the database as two distinct backups. Generating machine backups is outside the scope of the disclosed embodiment.

At S310, a database application is accessed. In an embodiment, accessing a database application includes detecting a database application deployed in a computing environment, such as a cloud computing environment. According to some embodiments, accessing a database application includes receiving a token, a credential, a combination thereof, and the like, to access the database. In an embodiment, accessing the database application includes accessing a machine, a workload, and the like, on which the database application is deployed.

According to certain embodiments, the database application is a stand-alone database application deployed on a virtual machine. The database application may include a SQL database or a NoSQL database. Examples of NoSQL databases include MongoDB® and CouchDB®. Examples of SQL databases include PostgreSQL, MySQL, MSSQL, and the like. It should be noted that the backup process is performed for any type of database application. That is, the same process can be performed for SQL, NoSQL, or any other type of database application.

At S320, a retrieval key of the database is determined. In some embodiments, the retrieval key is an index of rows, for example. The retrieval key may include a value assigned to each row, which is a unique value, such that no two rows include the same value.

In some embodiments, a retrieval key is generated based on a composite of multiple-column identifiers. For example, in an embodiment, two identifiers, each of a distinct column, form together a retrieval key. In certain embodiments, a plurality of retrieval keys is selected, each retrieval key corresponding to a table of the database.

At S330, data is exported from the database. The exported data may include at least tables and their contents. In an embodiment, exporting data from the database includes generating a plurality of queries. In an embodiment, the plurality of queries is generated, each based on a value range of the retrieval key. For example, in an embodiment, a first query of the plurality of queries is generated based on a value range of '0' to '10,000' of the retrieval key, and a second query of the plurality of queries is generated based on a value range of '10,001' to '20,000'. In an embodiment, there is no overlap between the values of the retrieval key for each of the generated queries.

In an embodiment, the query is generated in a query language, such as SQL. In an embodiment, data is exported from the database utilizing a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, a logical backup is a consistent snapshot, as opposed to a physical backup, which includes, for example, configuration files, raw files, directories, etc. As another example, in MongoDB, an export command mongoexport can be utilized to export collections (tables).

At S340, a plurality of backup files is generated. In an embodiment, the plurality of backup files is generated in a column-oriented data format, such as Apache® Parquet. In some embodiments, the plurality of backup files is generated such that a file, a group of files, etc., corresponds to a result of executing a query of the plurality of queries. Thus, data is exported from the database into a plurality of backup files.

In an embodiment, data is exported from the database application into the plurality of backup files by generating the plurality of queries, executing each query on the database, receiving a result for each query, and storing the results as data files in a column-oriented data format.

In some embodiments, for example, where a logical backup is generated (e.g., utilizing pg_dump command), the plurality of backup files is generated by converting the logical backup into a plurality of column-oriented data format files.

In some embodiments, for example, when collections are exported (e.g., utilizing mongoexport/or mongodump command), the plurality of backup files are generated by converting the logical backup into a plurality of column-oriented data format files.

At S350, the names of the columns in each exported table are classified to determine at least a category of each column. In an embodiment, S350 includes prompting an LLM with the contents of each column to determine the semantic meanings of that column. An example of such a prompt is provided above. In an embodiment, S350 may include unifying column names based on the classification. The results of the S350 are referred to as classification data. Examples of such classification data, including semantic meanings, are provided in Tables 1 and 2 above. In addition, the classification data may include the original column names and their corresponding unified (unified) names.

At S360, the database backup is created using multiple backup files. These files contain data exported from the databases. In some instances, the backup includes information such as a timestamp and a version identifier. This information indicates the date, time, or a combination of both when the backup was created. In an embodiment, the database backup includes metadata that stores the classification data for the backed-up tables. Additionally, the metadata may contain the database schemas for the database applications being backed up. That is, DB backup includes all data to restore the database, when needed.

It should be noted that S360 provides a data backup, in contrast to, for example, a machine backup. In some embodiments, the data backup includes a data structure, such as metadata of the database, a data schema of the database, table data, a store procedure, a view, a combination thereof, and the like. In an embodiment, database data (e.g., schema, views, store procedures, etc.) are extracted from a dump, for example utilizing pg_dump, without storing the data itself. Thus, a pg_dump command can be utilized to generate the data files in a first format that can be converted to, for example, files in a Parquet format.

It should be noted that the process described in FIG. 3 is performed for each table and database application to be backed up. It should be further noted that a data backup is not the same as a storage backup. In a storage backup, a block-for-block copy of the storage device is created, which includes the database data and includes a lot of data that is not useful for the actual database application, such as temporary files. It is, therefore, advantageous to store a backup only of the data of the database, without all the unnecessary files, folders, etc., which are not essential for the database to function properly.

Figure 4:
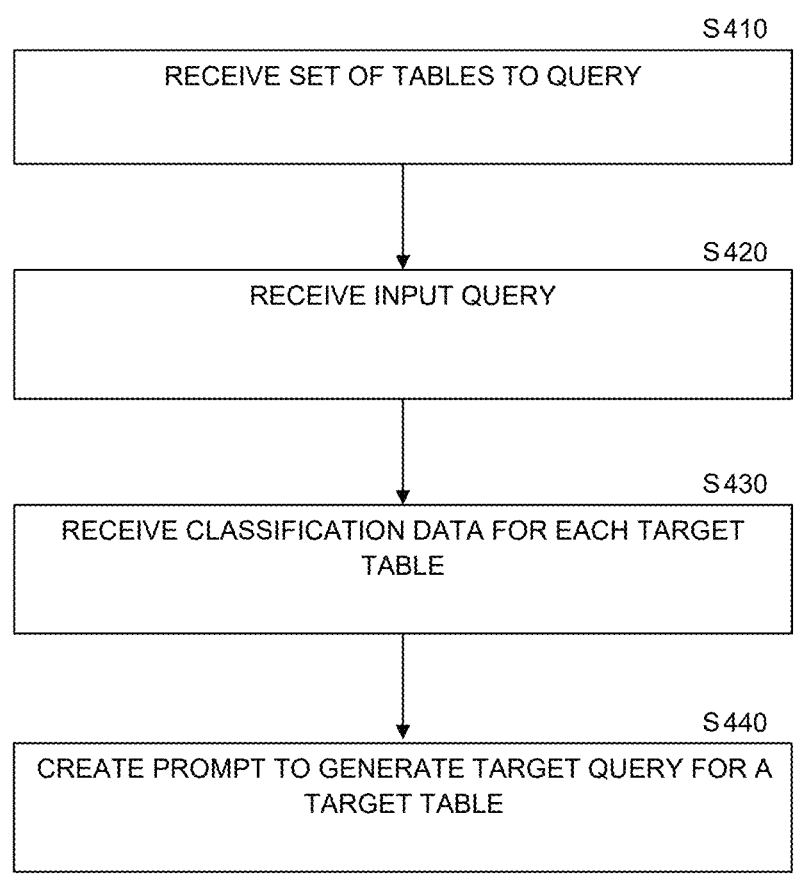
FIG. 4 is an example flowchart of a method for querying tables in the database backup in accordance with an embodiment.

FIG. 4 is an example flowchart of a method for querying multiple database applications stored in a database backup according to an embodiment. The method may be performed by backup system 140.

At S410, a set of tables to query is received. In an embodiment, a user selects the set of tables for the database backup. The selection may scroll through all tables in the backup, searching certain tables based on an index, tags, point in time, or any other selection filters provided by the backup system. It should be that the selected tables may include tables from different database applications. For example, a first selected table may be a backup of MySQL table, while a second selected table may be a backup MongoDB collection. The selected tables will be referred to as target tables.

At S420, an input query is received. In an embodiment, the input query is a free text input that does not comply with any standard or proprietary query language.

At S430, for each target table, its respective classification data is retrieved. As noted above, the classification data may be stored in the backup's metadata. The classification data includes the semantic meanings of columns in the selected tables together with unified column names. When classification data is unavailable for one or more selected tables, a classification process is carried out on each of those tables. This classification process is described in S350, FIG. 3.

At S440, a prompt to generate a target query for a target table is engineered or created. The purpose of the prompt is, when run by LLM, to provide a target query to the target table based on the input query. In an embodiment, engineering the prompt may include feeding to a preconfigured template the classification data, the input query text, or a portion of the input query text. The portion of the input query text may include meaningful information. It should be noted that engineering the prompt to include at least classification data improves the accuracy of results from an LLM. As such, the process can be executed while consuming fewer computing resources in less time. An example of a prompt template that can be utilized at S440 is provided above.

At S450, the prompt is fed to an LLM to generate the target query to the target table. In an embodiment, the LLM is general LLM, such as, GPT-4 (OpenAI), Claude (Anthropic), Gemini (Google), and LLAMA (Meta), or any other type of generative AI model. The LLM can be executed by a generative AI system. In an embodiment, the prompt may be a preconfigured template, where the contents of the columns are the variable parts of this template. In another embodiment, the LLM is a general LLM trained or tuned based on classification data of all tables in the database, as mentioned above. Further, the LLM utilized at S450 may be different than the prompt utilized at S440.

It should be noted that S430, S440, and S450 are performed for each target table. Thus, running S430, S440, and S450 on all target tables would result in a set of target queries, each of which corresponds to a target table. The target queries are in a format, or language, complaint with the database backup. In an example embodiment, the format of files is Parquet format, and the target queries are SQL queries. Therefore, regardless of whether the database application hosts a target table, the format of the target query is the same. To emphasize this embodiment using the example given above, a first target table may be a MySQL table, while a second target table may be a MongoDB collection, the target queries for both of these tables are SQL queries.

At S460, all target queries are executed over the database backup querying the target tables. In an embodiment, prior to execution of the queries, the user is requested to confirm this action and confirm the accuracy of the generated target queries.

In response, at S470, the query results are returned from the backup, aggregated, and displayed to the user. The aggregation is performed using standard aggregation functions, techniques, and/or tools. For example, the Athena aggregation function can be used.

Below is an example illustrating the operation of the method discussed in FIG. 4. The example will be described with reference to tables 200 and 220 shown in FIG. 2. That is, the user selects tables 200 and 220 to run the query. Here, the user input query is "find information about Moby-Dick".

The classification data for Table 200 and Collection 220 have been retrieved, as shown in Tables 1 and 2. A prompt is generated based on the classification data and the input query. A prompt may be generated for each target table (e.g., Table 200 and Collection 220). For example, the prompt for Table 200 may include:
create a query for a database that "find information about Moby-Dick" from a database having the following columns BookID|BookName|Price|QuantityAvailable
The target query would be an SQL query having the following format:
SELECT*FROM Books WHERE BookName='Moby Dick';
The prompt for Collection 220 may include:
create a query for a database that "find information about Moby-Dick" from a database having the following columns_id; titleName; authorName; and price having semantics as BookID| BookName| Price
SELECT*FROM Title WHERE titleName='Moby Dick';
The generated queries are executed over the respective target. In an embodiment, such queries are submitted only upon approval by the user.

In an embodiment, after the queries are answered queries answer the user may use the additional prompt to refine the query the input query, and the system will maintain the context of the conversation when accessing the LLM to accurate the answers.

Figure 5:
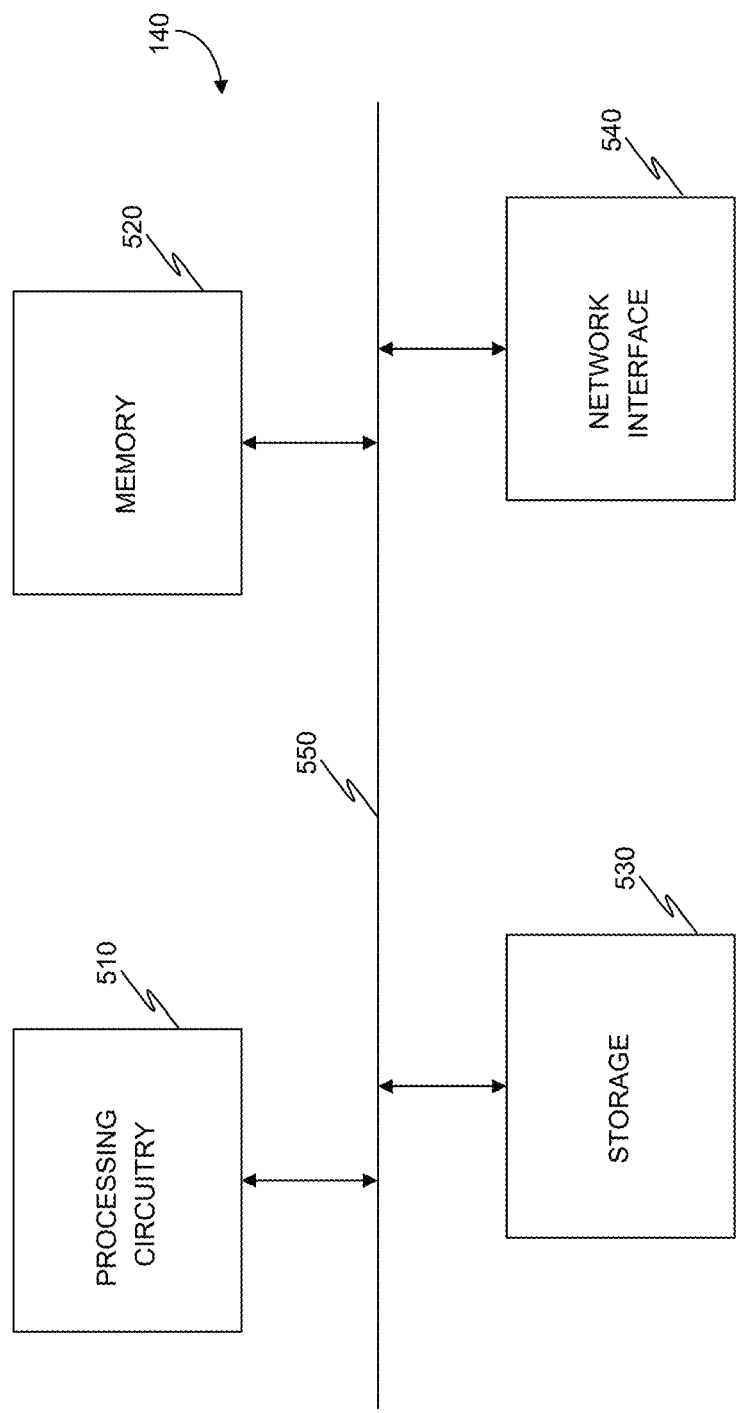
FIG. 5 is an example schematic diagram of a backup system according to an embodiment.

FIG. 5 is an example schematic diagram of a backup system 140 according to an embodiment. The backup system 140 includes, according to an embodiment, processing circuitry 510 coupled to a memory 520, a storage 530, and a network interface 540. In an embodiment, the components of the backup system 140 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information. The processing circuitry 510 is configured to operate as a generative AI system to execute, train, and/or perform inference on any type of language model.

In an embodiment, the memory 520 is a volatile memory (e.g., random access memory, etc.), a non-volatile memory (e.g., read-only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard disk drive, another memory technology, various combinations thereof, or any other medium which can be used to store the desired information.

The network interface 540 is configured to provide the backup system 140 with communication with, for example, the network 130, workloads 110, database applications 120, etc., according to an embodiment.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for querying multiple database tables in a database backup, comprising:
   receiving identification of database tables to query, wherein the database tables are stored in the database backup in a column-based format, and wherein the database backup includes for each database table classification data for at least classifying its respective column names, wherein the database tables to query are database tables of different database applications, wherein the classification data is generated by prompting a language model based on a set of values of columns in the respective database table;
   generating a prompt for a first language model that, when executed by a generative AI system, provides a set of queries targeting the database tables, wherein the generated prompt is based on at least a received input query and the classification data for the database tables;
   executing the set of queries on the database tables, wherein each query of the set of queries is executed on a respective database table; and
   aggregating and displaying results returned in response to the execution of the set of queries.

2. The method of claim 1, wherein each query of the set of queries is of the same query language compliant with the column-based format of the database backup.

3. The method of claim 1, wherein the input query is a free text query.

4. The method of claim 3, wherein a database application is at least any one of: a NoSQL database application and a SQL database application.

5. The method of claim 1, further comprising:
   classifying the column names of the database table.

6. The method of claim 5, further comprising:
   generating a prompt to a second language model based on at least a set of values in each column in the database table, the prompt, when executed by the generative AI system, outputs classification data for the database table; and
   saving the classification data in metadata of the database backup.

7. The method of claim 6, wherein the classification data includes, for each column in the database table, a category, a unified column name, and semantic meanings.

8. The method of claim 6, wherein the first language model is different than the second language model.

9. The method of claim 1, wherein the first language model is tuned based on classification data of the database tables.

10. A non-transitory computer-readable medium storing a set of instructions for querying multiple database tables in a database backup, the set of instructions comprising:
    one or more instructions that, when executed by one or more processing circuitries of a device, cause the device to:
      receive identification of database tables to query, wherein the database tables are stored in the database backup in a column-based format, and wherein the database backup includes for each database table classification data for at least classifying its respective column names, wherein the database tables to query are database tables of different database applications, wherein the classification data is generated by prompting a language model based on a set of values of columns in the respective database table;
      generate a prompt for a first language model that, when executed by a generative AI system, provides a set of queries targeting the database tables, wherein the generated prompt is based on at least a received input query and the classification data for the database tables;
      execute the set of queries on the database tables, wherein each query of the set of queries is executed on a respective database table; and
      aggregate and display results returned in response to the execution of the set of queries.

11. A system for querying multiple database tables in a database backup comprising:
    one or more processing circuitries configured to:
      receive identification of database tables to query, wherein the database tables are stored in the database backup in a column-based format, and wherein the database backup includes for each database table classification data for at least classifying its respective column names, wherein the database tables to query are database tables of different database applications, wherein the classification data is generated by prompting a language model based on a set of values of columns in the respective database table;
      generate a prompt for a first language model that, when executed by a generative AI system, provides a set of queries targeting the database tables, wherein the generated prompt is based on at least a received input query and the classification data for the database tables
      execute the set of queries on the database tables, wherein each query of the set of queries is executed on a respective database table; and
      aggregate and display results returned in response to the execution of the set of queries.

12. The system of claim 11, wherein each query of the set of queries is of the same query language compliant with the column-based format of the database backup.

13. The system of claim 11, wherein the input query is a free text query.

14. The system of claim 12, wherein a database application is at least any one of:
   a NoSQL database application and a SQL database application.

15. The system of claim 11, wherein the one or more processing circuitries are further configured to:
   classify the column names of the database table.

16. The system of claim 15, wherein the one or more processing circuitries are further configured to:
   generate a prompt to a second language model based on at least a set of values in each column in the database table, the prompt, when executed by the generative AI system, outputs classification data for the database table; and
   save the classification data in metadata of the database backup.

17. The system of claim 16, wherein the classification data includes, for each column in the database table, a category, a unified column name, and semantic meanings.

18. The system of claim 16, wherein the first language model is different than the second language model.

19. The system of claim 11, wherein the first language model is tuned based on classification data of the database tables.

* * * * *